(12) United States Patent
Downing (10) Patent No.: US 12,013,558 B2
(45) Date of Patent: Jun. 18, 2024

(54) ABILITY TO THREE-DIMENSIONALLY PRINT AN APERTURE MASK ON A MULTI SPECTRAL FILTER ARRAY

(71) Applicant: Materion Corporation, Mayfield Heights, OH (US)

(72) Inventor: Kevin R. Downing, Westford, MA (US)

(73) Assignee: MATERION CORPORATION, Mayfield Heights, OH (US)

( * ) Notice: Subject to any disclaimer, the term of this patent is extended or adjusted under 35 U.S.C. 154(b) by 161 days.

(21) Appl. No.: 17/206,659

(22) Filed: Mar. 19, 2021

(65) Prior Publication Data

US 2021/0206156 A1    Jul. 8, 2021

Related U.S. Application Data

(63) Continuation of application No. 16/215,763, filed on Dec. 11, 2018, now Pat. No. 10,981,372, which is a continuation of application No. 15/351,535, filed on Nov. 15, 2016, now Pat. No. 10,189,239.

(60) Provisional application No. 62/268,300, filed on Dec. 16, 2015.

(51) Int. Cl.
| | | |
|---|---|---|
| G02B 5/20 | (2006.01) | |
| B29C 64/106 | (2017.01) | |
| B29C 64/20 | (2017.01) | |
| B29C 70/78 | (2006.01) | |
| B33Y 10/00 | (2015.01) | |
| B33Y 30/00 | (2015.01) | |
| G02B 5/00 | (2006.01) | |

(52) U.S. Cl.
CPC ........... *G02B 5/201* (2013.01); *B29C 64/106* (2017.08); *B29C 64/20* (2017.08); *B29C 70/78* (2013.01); *B33Y 10/00* (2014.12); *B33Y 30/00* (2014.12); *G02B 5/003* (2013.01)

(58) Field of Classification Search
CPC ...... G02B 5/201; G02B 5/003; B29C 64/106; B29C 64/20; B29C 70/78; B33Y 10/00; B33Y 30/00
USPC ......... 118/300, 313–315, 641–643, 663, 665
See application file for complete search history.

(56) References Cited

U.S. PATENT DOCUMENTS

| | | | | |
|---|---|---|---|---|
| 5,753,375 A | * | 5/1998 | Ray | ................... H01L 21/76877 428/209 |
| 2005/0225238 A1 | | 10/2005 | Yamazaki | |
| 2005/0278056 A1 | * | 12/2005 | Farnworth | .......... G03F 7/70416 700/121 |
| 2006/0051493 A1 | * | 3/2006 | Tella | .................... B01J 19/0046 118/713 |

(Continued)

*Primary Examiner* — Michael G Miller
(74) *Attorney, Agent, or Firm* — TUCKER ELLIS LLP (57) ABSTRACT

A three-dimensional inkjet printer and method for printing an aperture mask on a multi-spectral filter array. A custom tray is used by the printer allowing for printing on a prefabricated filter array. Photopolymer resin is deposited on the prefabricated filter array to form the aperture mask of dark mirror coating. An ultraviolet lamp illuminates the deposited photopolymer resin on the surface of the prefabricated multi-spectral optical filter array to cure the resin, thereby forming the mask. The prefabricated multi-spectral optical filter array includes an optical coating on at least one side, the aperture mask being formed on the optical coating, without the use of heat, chemical etching, or deformation of the optical coating.

19 Claims, 3 Drawing Sheets

(56) References Cited

U.S. PATENT DOCUMENTS

| | | |
|---|---|---|
| 2006/0073398 A1 | 4/2006 | Kang et al. |
| 2008/0110395 A1 | 5/2008 | Kritchman et al. |
| 2009/0244448 A1 | 10/2009 | Chang |
| 2010/0237362 A1 | 9/2010 | Okabe |
| 2011/0100386 A1 | 5/2011 | Watters et al. |
| 2011/0188070 A1* | 8/2011 | Pala .................. G06F 15/00 358/1.15 |
| 2012/0147468 A1 | 6/2012 | Bell et al. |
| 2013/0280498 A1 | 10/2013 | Horiuchi et al. |
| 2014/0307309 A1* | 10/2014 | Downing .............. G02B 27/28 359/359 |
| 2015/0273769 A1* | 10/2015 | Korn .................. B29C 64/153 264/405 |

\* cited by examiner

ANGLED ARRAY

ABILITY TO THREE-DIMENSIONALLY PRINT AN APERTURE MASK ON A MULTI SPECTRAL FILTER ARRAY

CROSS-REFERENCE TO RELATED APPLICATIONS

This application is a continuation of U.S. Non-Provisional application Ser. No. 16/215,763 filed Dec. 11, 2018, which is a continuation of U.S. patent application Ser. No. 15/351,535, filed on Nov. 15, 2016, which claims priority to U.S. Provisional Patent Application Ser. No. 62/268,300, filed on Dec. 16, 2015, the disclosures of which are hereby fully incorporated by reference.

BACKGROUND

The present disclosure relates to the additive manufacturing arts, three-dimensional printing arts, filter arts, optical arts, coating arts, and the like.

Additive manufacturing (AM) is a new production technology for the rapid and flexible production of prototype parts, end-use parts, and tools using three-dimensional (3D) computer aided design (CAD) models. AM functions to add thin layers between 16 microns and 180 microns of material at a time to create an object. AM produces three-dimensional solid objects of virtually any shape from a digital model. Generally, this is achieved by creating a digital blueprint of a desired solid object with CAD modeling software and then slicing that virtual blueprint into very small digital cross-sections or layers. Each layer begins with a thin distribution of powder, such as metal powder, over the surface of a bed or platform. The powder is selectively joined where the object is to be formed. A piston that supports the bed or platform within a build box lowers so that the next powder layer can be spread over the previous layer and selectively joined. This sequential layering process repeats within an AM machine (such as a three-dimensional printer) to build up the desired part. Unbound powder is removed, and the NNS fabricated part or coated part can be further treated.

AM has many advantages, including dramatically reducing the time from design to prototyping to commercial product. Demonstration units and parts can be rapidly produced. Parts can be created of any geometry, and generally out of any material, including ceramics, metals, polymers, and composites. Local control can be exercised over the material composition, microstructure, and surface texture. Modifications and customizations are possible. Multiple parts can be built in a single assembly. No complicated potentially one-time die or tooling needs to be made before a prototype can be produced. Minimal energy is needed to make these three-dimensional solid objects. It also decreases the amount of waste and raw materials. AM also facilitates the production of extremely complex geometrical parts. Support material can be used to create overhangs, undercuts, and internal volumes. AM also reduces the parts inventory for a business since parts can be quickly made on-demand and on-site.

Three conventional AM methods include electron beam melting, laser beam melting, and laser sintering. In electron beam melting, after the deposition of a powder layer, the loose powder cross-section is melted or fused by an electron beam. Similarly, in laser beam melting, a laser is used to melt or fuse the material being deposited, which can be in the form of a loose powder deposition or fed as a powder or wire while the layers are formed. In laser sintering, a laser beam is used to sinter areas of the loosely compacted powder cross-section. The term "sintering" refers to the process by which particulates adhere into a solid mass, eliminating porosity while maintaining itself in a solid state, due to externally applied energy. These methods will also fuse a given cross-section with the already sintered or melted cross-section beneath. The metal powder that is not struck by the electron or laser beam remains loose and falls away from the finished part when removed from the AM machine. Alternatively, the part can be depowdered by vacuuming, by compressed air, or by a fluid to wash the completed part and dislodge any loose powder. Subsequent finishing steps may also be applied to the part to produce the characteristics desired. Such steps include, but are not limited to, further heat treatment, curing, sintering, annealing, and final surface finishing.

It should be noted that the above-mentioned AM methods each involve heat, and form the object on a base platform that is a part of the printer/AM manufacturing device itself. With the use of heat treatment to sinter or otherwise cure the object, the use of these types of AM methods is limited. A possible solution to the use of heat in the AM manufacturing process is another method involving photopolymerisation.

Photopolymerisation is a technique that involves the solidification of photo-sensitive resin by means of an ultra-violet ("UV") light. Photopolymerization is used by different three-dimensional printing processes such as three-dimensional Digital Light Processing (DLP), Stereolithography (SLA), and other inkjet-type printers. SLA uses a vat of photopolymer resin that can be cured. The build plate moves down in small increments and the liquid polymer is exposed to light where the UV laser draws a cross section layer by layer. The process repeats until a model has been created. The object is three-dimensional printed by pulling the object out of the resin (bottom up) which creates space for the uncured resin at the bottom of the container and can then form the next layer of the object. Another way is to three-dimensional print the object by pulling it downward into the tank with the next layer being cured on the top. These photopolymer parts do not have the strength of SLS or FDM parts, but can typically achieve much higher levels of detail. As the photopolymer is UV sensitive, these products are susceptible to deforming and changing colors in sunlight. SLA is commonly used to generate highly detailed artwork, non-functional prototypes, and can be used to make molds in investment casting applications).

In DLP, a projector is used to cure photopolymer resin. The DLP AM method is substantially similar to SLA, wherein instead of a UV laser to cure the photopolymer resin, a safelight (light bulb) is used. Objects are created the same as SLA with the object being either pulled out of the resin which creates space for the uncured resin at the bottom of the container and to form the next layer of the object or down into the tank with the next layer being cured on the top.

Objects that are printed with Digital Light Processing have less visible layers versus other processes such as FDM/FFF. Compared with SLA, DLP can have faster build speeds due to a single layer being created in one singular digital image whereas with SLA, the UV laser has to scan the vat with a single point (trace out the object layer). Also, the same photopolymer resins that can be used with SLA can be used for DLP three-dimensional Printing. Objects printed with this process have the same strengths and weaknesses. Similar to SLA, DLP is commonly used to generate highly detailed artwork, non-functional prototypes, and can be used to make molds in investment casting applications.

In inkjet-type AM methods, a process similar to stereolithography is employed. Three-dimensional inkjet printers use a UV light to crosslink a photopolymer. However, rather than scanning a laser to cure layers, a printer head jets tiny droplets of the photopolymer (similar to ink in an inkjet printer) in the shape of the first layer. The UV lamp attached to the printer head crosslinks the polymer and locks the shape of the layer in place. The build platform then steps down one layer thickness and more material is deposited directly on the previous layer. This is process is repeated until the part has completed printing. Combining two or three materials in specific concentrations and microstructures (poly-jet three-dimensional printing) allows the production of a range of materials with varying translucency, rigidity, thermal resistance or color. Using this process, a single part can contain materials with diverse physical and mechanical properties ranging from rubber-like flexibility to ABS-like rigidity. Similar to SLA, the photopolymer is vulnerable to sunlight and heat, and the material can creep over time. Poly-jet three-dimensional printing is typically used for developing fully assembled prototypes and complex and detailed geometries with multiple material properties.

Each AM method or process described above, and the printers currently available, all form an object from scratch. That is, none of the processes or devices is currently capable of building upon an existing structure or substrate. Part of the reasons for this are the incompatibility of the materials, the susceptibility of the existing structure to warping or other damage from heat or submersion in materials, the instructions set requiring a flat platform upon which to build, and the like. This problem is exacerbated when dealing with existing structures or substrates that are already coated in films, e.g., optical wafers, filters, etc., and which can react negatively to the application of heat, certain wavelengths of light, and the like.

For example, optical filters with high spectral selectivity are manufactured using a stack of layers, with alternating layers of two (or more) constituent materials having different refractive index values. Such filters may be referred to as interference filters, and can be designed to provide a designed pass-band, stop-band, high-pass, or low-pass output. For pass-band filters, the width of the pass-band can typically be made as narrow as desired by using more layer periods in the stack, albeit possibly with some transmission loss at the peak transmission wavelength. A notch filter can be similarly designed by constructing the stack of layers to form a Bragg reflector blocking the stop-band. The layer stack is deposited on a substrate that is optically transmissive for the wavelength or wavelength range to be transmitted, and may for example be a glass plate for an optical filter operating in the visible spectrum. This results in a filter plate whose structural rigidity is provided by the substrate.

In such optical filters, a given filter plate operates at a single well defined pass band or stop band. The layers of the stack are typically required to have precise thicknesses to meet the specified wavelength and bandwidth for the pass band or stop band.

However, it is difficult or impossible to vary the layer thicknesses across the substrate plate during layer deposition or by post deposition processing in a controlled manner in order to provide different pass bands or stop bands in different areas of the plate. Such an arrangement is useful for a spectrometer, spectrum analyzer, or other "multi spectral" applications.

Filter arrays address this problem by fabricating a set of filter plates with different filter characteristics (e.g. different pass band or stop band wavelength and/or bandwidth). The filter plates are then diced to form filter elements in the form of strips. These strips are then bonded together in a desired pattern to form the filter array. The resulting filter array is sometimes referred to as a "butcher block" due to its similarity in bonding structural elements (filter elements here, c.f. wood elements in the case of an actual butcher block). This approach decouples the optical characteristics of each filter element of the filter array from those of the other filter elements, enabling substantially any combination of filter elements in a single filter array.

Currently, aperture masks are deposited in a similar fashion as the optical coatings themselves. The aperture masks are deposited using a photolithographic process and an optical coating. A chemical compound is applied to the filter array or wafer in a design corresponding to the desired aperture. This forms a mask on the wafer, masking away those portions that are to remain. An etching compound is then applied, which removes the non-masked portions of the wafer. The mask is then removed via application of a suitable chemical leaving the aperture mask formed on the wafer.

Furthermore, some of these optical components employ microstructures, which require additional instructions to the printer as to where to deposit the materials for printing, especially for those microstructures having different heights to which the printer must adapt without damaging the underlying substrate. It would be desirable to have systems and methods that allow for printing coatings onto an optical wafer that eliminate the aforementioned problems while implementing the advantages of additive manufacturing processes.

BRIEF DESCRIPTION

In accordance with one embodiment, provided herein is a system and method for three-dimensional printing of coatings on various filter arrays having optical coatings thereon. In one embodiment, the system and method allow for the inkjet printing of dark mirror coatings on a previously manufactured substrate.

In accordance with one embodiment, there is provided a system comprising a three-dimensional printer having a custom tray for placement of a prefabricated substrate, the three-dimensional printer configured to print an aperture mask on at least one of a top or a bottom of the prefabricated substrate.

According to another embodiment, there is provided a method, comprising prefabricating an optical filter having an optical coating on at least one surface thereof, providing a custom tray for a three-dimensional printer, the custom tray configured to support the prefabricated optical filter. The method further comprises positioning the prefabricated optical printer on the custom tray provided to the three-dimensional printer, and printing, by the three-dimensional printer, an aperture mask on the optical coating of the prefabricated optical filter.

In another embodiment, there is provided a three-dimensional inkjet printer that includes a tray and a print block. The tray is configured to support a prefabricated multi-spectral optical filter array. The print block includes at least one inkjet head in fluid communication with a reservoir storing a photopolymer resin, the at least one inkjet head configured to deposit the photopolymer resin onto a surface of the prefabricated multi-spectral optical filter array forming an aperture mask thereon, and at least one ultraviolet lamp illuminating deposited photopolymer resin on the surface of the prefabricated multi-spectral optical filter array. The prefabricated multi-spectral optical filter array includes an optical coating on at least one side, the aperture mask being formed on the optical coating.

In one aspect, a prefabricated optical filter array comprises a plurality of optical filter elements of different optical filter types, the optical filter elements having slanted sidewalls, the optical filter elements bonded together at the slanted sidewalls to form an optical filter array.

In another aspect, a prefabricated optical filter array comprises a first set of a plurality of optical filter elements of different optical filter types, a second set of a plurality of optical filter elements of different optical filter types, the optical filter elements of the first and second sets having perpendicular sidewalls, the optical filter elements of the first and second sets bonded together at the perpendicular sidewalls, the first and second sets bonded together to form a parallel optical array In still another aspect, a three-dimensional printer is modified to allow for use of an existing substrate, such modification including physical modification of the tray to allow use of the existing substrate and modification of the control hardware and/or software to enable three-dimensional printing on an existing substrate.

In another aspect, the existing substrate is a filter array having an optical coating on a front surface and a back surface, wherein a dark mirror coating is printed on the front and back surface of the filter array on top of the optical coating without damaging said coating.

In yet another aspect, the filter array is a multispectral filter array implemented as an angled array, wherein the dark mirror coating is printed at predetermined locations on the front and back surfaces thereof In still another aspect, the filter array is a multispectral filter array implemented as implemented as a parallel array, wherein the dark mirror coating is printed at predetermined locations on the front surface and back surface thereof In still yet another aspect, the three-dimensional printer is configured to print multiple coatings on the optical coated front and/or back surfaces of the filter array.

These and other aspects will be apparent to those skilled in the art upon viewing the accompanying figures and descriptions set forth herein.

BRIEF DESCRIPTION OF THE DRAWINGS

The subject disclosure may take form in various components and arrangements of component, and in various steps and arrangement of steps. The drawings are only for purposes of illustrating the preferred embodiments and are not to be construed as limiting the subject disclosure.

DETAILED DESCRIPTION OF THE EXEMPLARY EMBODIMENTS

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure may refer to temperatures for certain process steps. It is noted that these generally refer to the temperature at which the heat source (i.e., furnace, oven, etc.) is set, and do not necessarily refer to the temperature that must be attained by the material being exposed to the heat.

The term "room temperature" as used herein refers to a temperature in the range of 20° C. to 25° C.

It is noted that the coefficient of thermal expansion is typically reported as the average between a starting temperature and a reported temperature.

It is further noted that as used herein, "dark mirror coating", "aperture mask", "mask", may be used interchangeably, unless understood by the context in which they are used below to refer to distinct embodiments. For example, an "aperture mask" may comprise other coatings besides "dark mirror", and the use herein is intended solely to assist the reader and not to limit application of the subject disclosure to only aperture masks of dark mirror coating materials.

FIGS. 1-3C, as explained in greater detail below, depict examples of the application and location of an opaque aperture mask on a variety of filter arrays. According to several embodiments set forth herein, the application may be performed on one or both faces of the filter creating an aperture mask on the entrance and/or the exit face. It be appreciated that the non-limiting examples of FIGS. 1-3C illustrate embodiments wherein the aperture mask may be offset from the entrance face or the exit face, taking into account the incident angle of a light ray.

Figure 1:
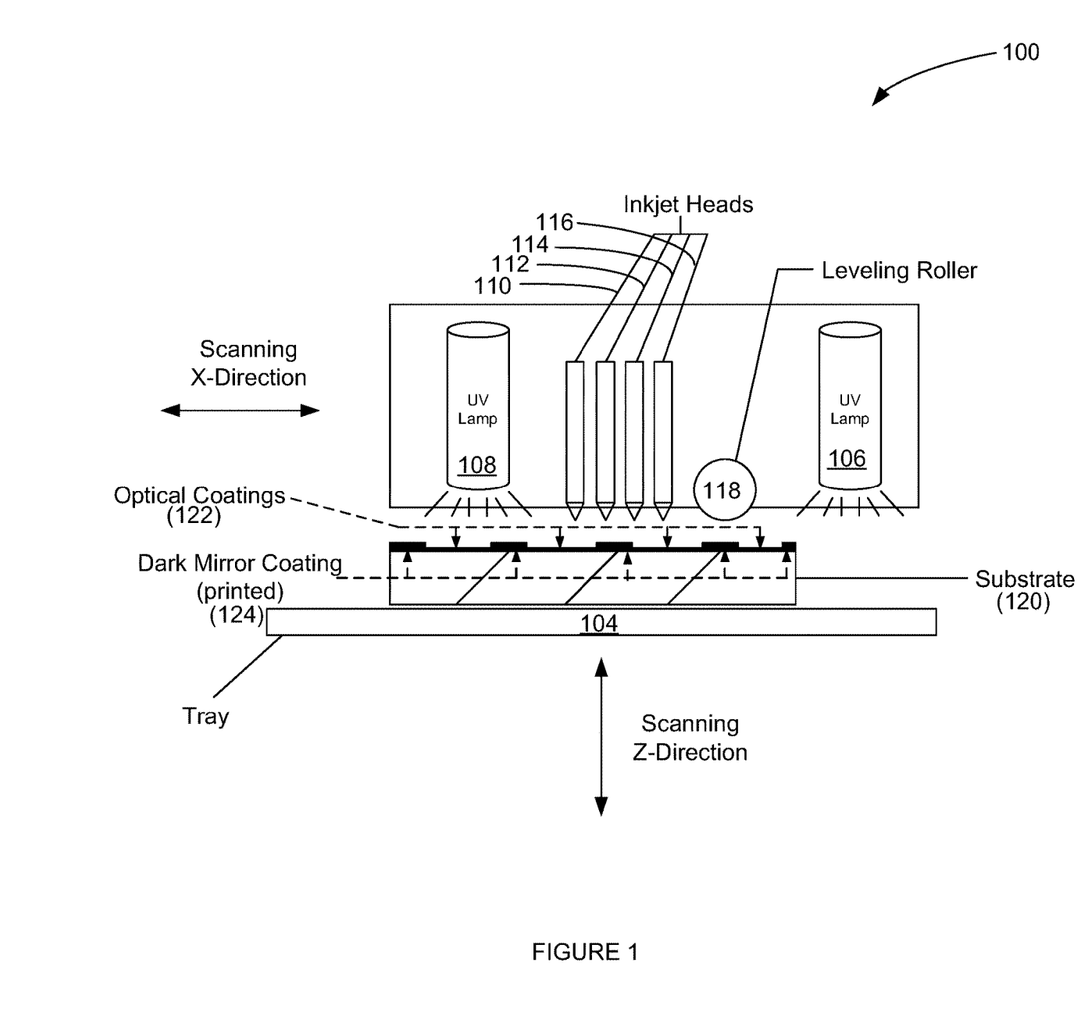
FIG. 1 illustrates a block diagram of a three-dimensional, inkjet printer capable of implementing the systems and methods of the subject application.

Turning now to FIG. 1, there is shown a three-dimensional printer 100 in accordance with one embodiment of the subject application. As shown in FIG. 1, the three-dimensional printer 100 depicted therein is an inkjet printer, suitably capable of printing, via multiple ink dispensing components (shown as inkjet heads 110, 112, 114, and 116), photopolymer resin onto a substrate 120 (as described in greater detail below with respect to FIGS. 2A-3C).

The three-dimensional printer 100 includes a movable print block 102 that includes the various printing components of the printer 100. As depicted in FIG. 1, the printing block 102 includes one or more ultraviolet ("UV") lights, e.g., UV lamp 106 and UV lamp 108, configured to cure photopolymer resin deposited by the one or more inkjet heads 110-116. It will be appreciated that while two distinct UV lamps 106 and 108 are depicted in FIG. 1, the subject disclosure is capable of operations on printers having a single UV light source, or more than two UV light sources. The print block 102 further includes a leveling roller 118 adjacent to the tips of the one or more inkjet heads 110-116, the roller 118 adapted to smooth the surface of the substrate 120 after deposition of the photopolymer resin. The printer block 102 is movable in the x and y directions relative to the support or tray 104 upon which the object being printed is located.

The tray 104 is configured to support the prefabricated substrate 120. As will be appreciated, typical three-dimensional printers are not capable of printing on a preexisting form. In contrast, the tray 104 of the printer 100 illustrated in FIG. 1 includes a customized tray/platform that will be capable of supporting the prefabricated substrate 120 (e.g., filter or wafer) for printing. In one embodiment, the tray 104 may be implemented as a vacuum chuck with the ability to locate the start position of the print head, e.g., inkjet heads 110-116, and thereby enable X, Y, Z adjustments to allow the print head to start at a given point.

It will be appreciated that each inkjet head 110-116 may output a different type or color of photopolymer resin, similar to the manner in which an inkjet printer outputs ink of different colors onto a paper medium. The inkjet heads 110-116 in fluid communication with corresponding reservoirs (not shown) that are capable of storing different types of photopolymer materials. It will be appreciated that the printer 100 depicted in FIG. 1 includes multiple inkjet heads 110-116, however the subject disclosure is capable of implementation utilizing a single inkjet head for printing, be equipped with a single inkjet head, or the like. It will further be appreciated that the use of the inkjet heads 110-116 allows for the formation of any configuration of mask to be deposited directly onto the substrate 120 regardless of size or shape. Furthermore, it will be appreciated that such printing by the inkjet heads 110-116 (as discussed below), does not utilize heat or chemicals (e.g., etching), and does enable masking in any direction, including three-dimensionally (e.g., microstructures).

It will be understood that the example embodiment of FIG. 1 of an inkjet-type additive manufacturing printer is intended for example purposes only. Other types of additive manufacturing may also be utilized in accordance with varying embodiments of the systems and methods set forth herein. For example, the printer 100 of FIG. 1 may be implemented as an extrusion-type printer, i.e., fused filament fabrication printer, replacing the inkjet heads 110-116 with an extrusion port (not shown). The extrusion port may then extrude thermoplastic onto the prefabricated substrate 120 to generate the pattern of the aperture mask thereon. The extruded plastic may comprise a UV-curable material, or another suitable material to provide a desired opaqueness in accordance with varying additive manufacturing techniques. Fused deposition modeling may also be used to form the aperture mask on the prefabricated substrate 120. It will be appreciated, however, that such varying types of three-dimensional printers may be implemented using a UV-curable (or other non-heat curable) material to avoid damage to the optical coating(s) of the prefabricated substrate 120.

As shown in FIG. 1, a preexisting or prefabricated optical filter array, i.e., the substrate 120, is positioned on the tray 104 below the print block 102. In accordance with one embodiment, the array 120 is a multi-spectral optical filter array, as will be appreciated by the skilled artisan. The array 120 may comprise an optical wafer, as will be understood. The array 120 of FIG. 1 corresponds to an angled array, a more detailed view of which is presented in FIGS. 2A-2B. The top of the array 120 shown in FIG. 1 includes an optical coating 122, previously applied to the array 120. The three-dimensional printer 100 is adapted to print dark mirror coating 124 on the optical coating 124 of the array 120. In accordance with one embodiment, the dark mirror coating 124 is a photopolymer resin applied via the inkjet heads 110-116 at predetermined locations on the array 120. The tray 104 and print block 102 operate in conjunction to position the array 120 relative to the inkjet heads 110-116 to enable printing of the dark mirror coating 124 thereupon.

Figures 2A, 2B:
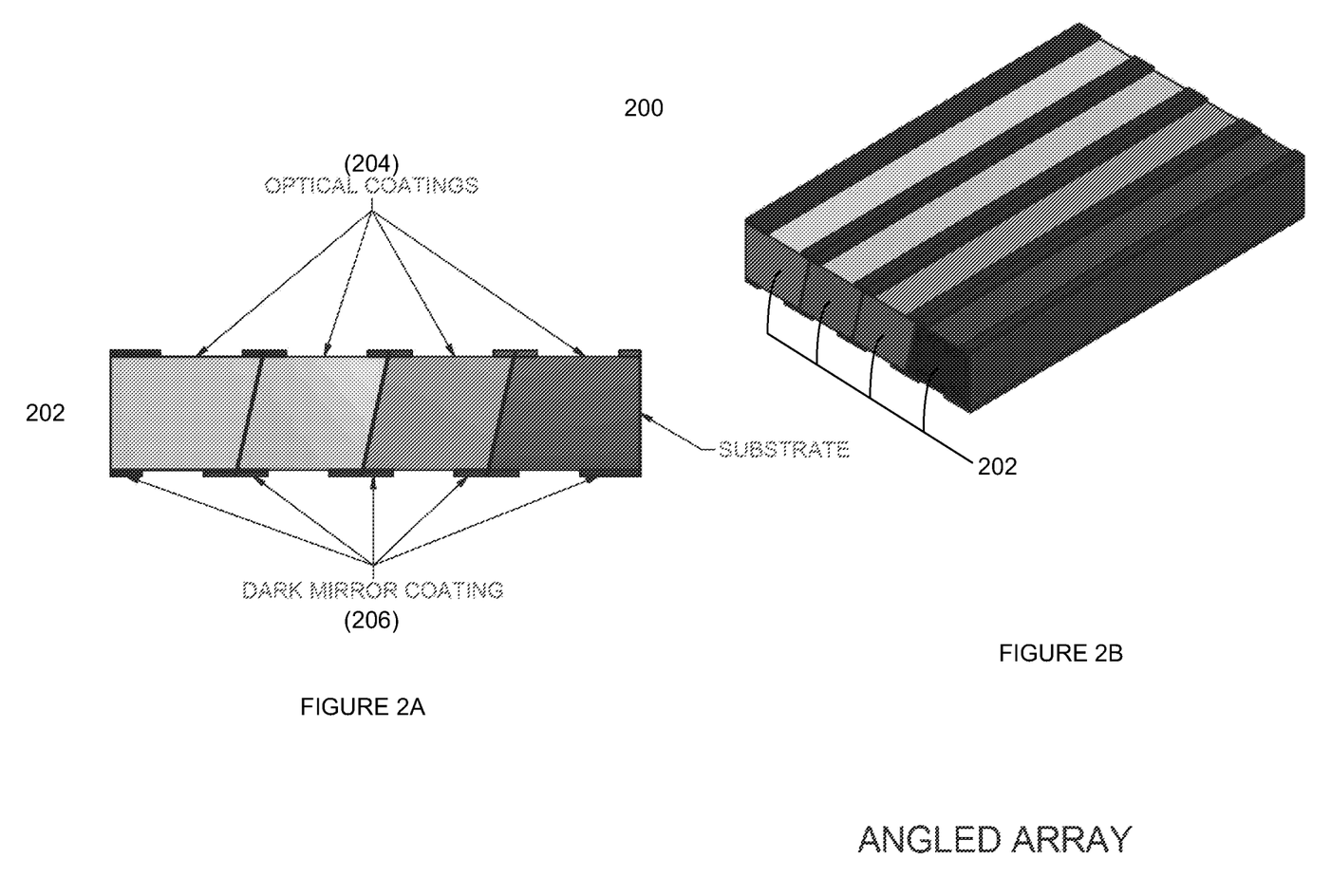
FIG. 2A depicts a side view of an angled array having dark mirror coatings printed thereon by the three-dimensional printer of FIG. 1.
FIG. 2B depicts a perspective view of the angled array having dark mirror coatings printed thereon of FIG. 2A.

The preexisting or prefabricated array 120 depicted in FIG. 1 shows dark mirror coating 124 having been printed on the optical coating 122 on a single side of the array 120. FIG. 2, as briefly mentioned above, provides a more detailed illustration of an angled array 200 similar to the array 120 shown in FIG. 1. As shown in FIGS. 2A-2B, the angled array 200 comprises a plurality of optical filter elements 202, each including a parallelogram-shaped structure with parallel light entrance and exit surfaces and parallel slanted sidewalls slanted at an angle, and an interference filter (i.e., optical coatings 204) disposed on one or both of the light entrance surface and the light entrance exit. The optical filter elements 202 are bonded together at the slanted sidewalls to form the optical filter array 200. A more detailed description of the angled array 200 and method of forming same is disclosed in co-pending U.S. patent application Ser. No. 14/250,553, filed Apr. 11, 2014 titled "FILTER ARRAY WITH REDUCED STRAY LIGHT," the disclosure of which is incorporated herein by reference in its entirety.

FIGS. 2A-2B further illustrate the angled array 200 having a plurality of dark mirror coatings 206 printed on the optical coatings 204 of the light entrance surface and the light exit surface. The dark mirror coatings 206 comprise a photopolymer resin that functions to eliminate transmission in the order of an optical density of 5 from the UV to the LWIR and be low reflecting (in the order of 3-5%) over the same aforementioned wavelength range. It will be appreciated that such an implementation will assist in the elimination of stray light and crosstalk between optical bands. Suitable examples of such photopolymer resins capable of functioning as set forth above include, for example and without limitation, Proto 3000 series, XYZ, Polycarbonate, Hackaday, Fromlabs, and Curbell products, as well as nylon thermoplastics, PLA, acrylate photopolymer resin, ABS and/or sandstones. It will be appreciated that the use of the three-dimensional printer 100 to print the dark mirror coatings 206 requires the use of a suitable platform It will be appreciated that the filter 200 utilizes a modified tray (not shown) for the printer 100, along with a control component (not shown) operable to execute control instructions to allow the printer 100 to print the dark mirror coatings 206 on the optical coating 204 overlaying the outer surface of the filter 200. It will be appreciated that such a modified tray 104 would include customized tray/platform that will be capable of supporting the prefabricated substrate 120, e.g., filter or wafer, for printing. The tray 104 may comprise a vacuum chuck with the ability to locate the start position of the inkjet heads 110-116 and allow X, Y, Z adjustments to allow the print head 110-116 to start at a given point. It will further be appreciated that the control instructions executed by the control component is configured to utilize the modified tray.

Figures 3A, 3B, 3C:
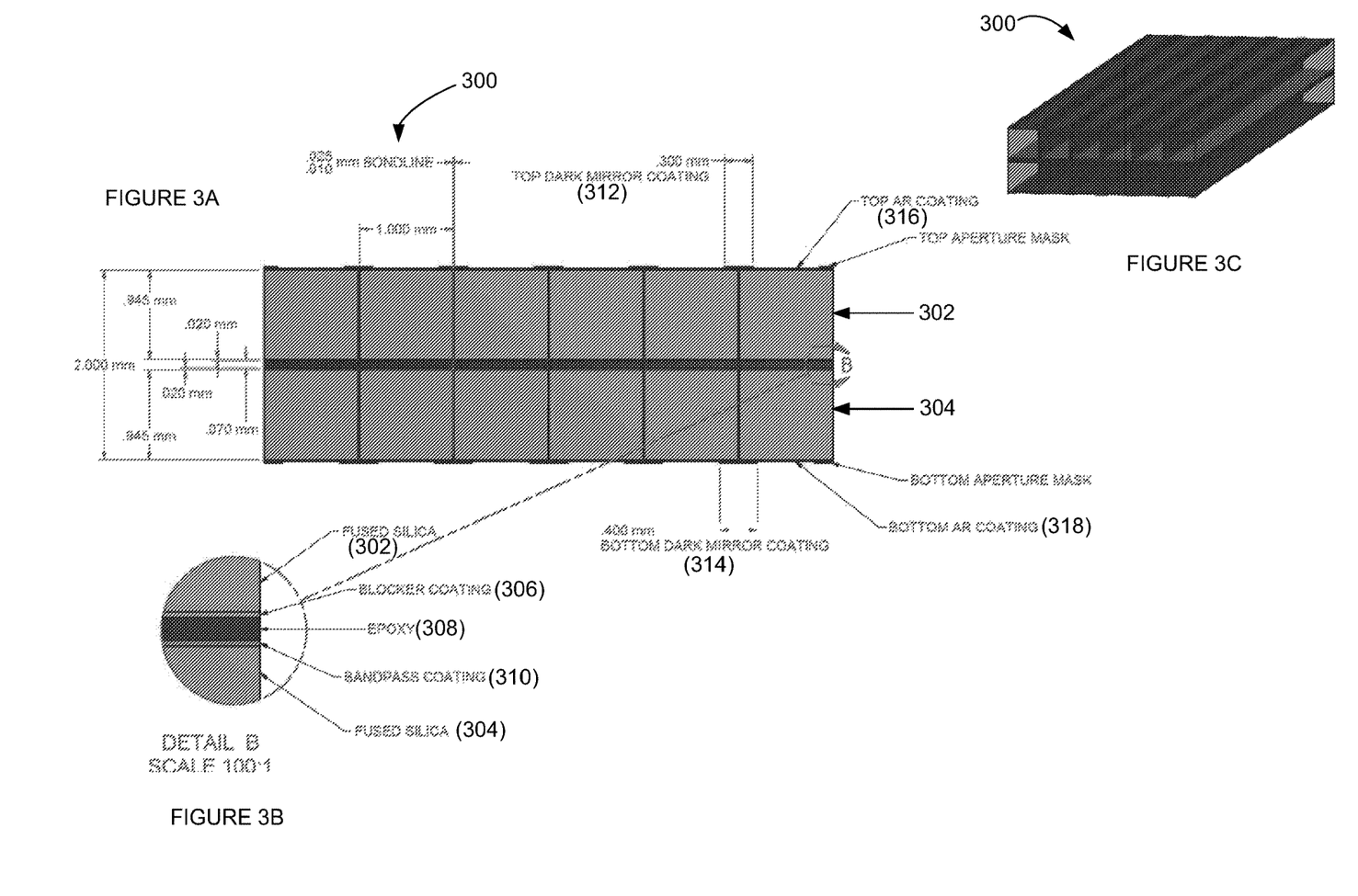
FIG. 3A depicts side view of a six-band array having dark mirror coatings printed thereon by a three-dimensional inkjet printer according to varying embodiments of the subject application.
FIG. 3B depicts a close-up view of the intersection of the six-band array of FIG. 3A.
FIG. 3C depicts a perspective view of the six-band array of FIG. 3A.

FIG. 3A provides an illustration of another filter 300 capable of being placed on the tray 104 of the printer 100 for printing of dark mirror coatings 312, 314 thereon. The six-band filter 300 of FIG. 3A comprises two filter arrays 302 and 304 sandwiching a blocker coating 306, epoxy 308, and a bandpass coating 310, as shown in FIG. 3B. The top dark mirror coating 312 depicted on the top of the filter 300 corresponds to a top aperture mask, whereas the bottom dark mirror coating 314 corresponds to a bottom aperture mask. FIG. 3C illustrates the six-band filter 300 in perspective, depicting the various filter elements and coatings in three-dimensions, as such filter 300 would be printed upon by the printer 100 of FIG. 1. Similar to the filter 200, the six-band filter 300 would utilize a modified tray (not shown) for the printer 100, along with control instructions to allow the printer 100 to print the dark mirror coatings 312 and 314 on the respective AR optical coatings 316 and 318 overlaying the outer surface of the filter 300. It will be appreciated that such a modified tray would include a vacuum chuck with the ability to locate the start position for printing and allow X, Y, Z adjustments of the print head(s) 110-116 to start at a particular position.

Returning to FIG. 1, during operation of the printer 100 in accordance with the subject disclosure, the print block 100 (or the tray 104) moves the array 120 into the correct position to begin the printing process. Upon achieving the correct position, the inkjet heads 110-116 deposit photopolymer resin onto the substrate 120 at predetermined positions thereon. As the print block 100 moves relative to the tray 104 (or alternative, as the tray 104 moves relative to the print block 100), the leveling roller 118 functions to level deposited photopolymer resin as required. During this movement, the UV lamps 106 and 108 illuminate to provide UV light, to which the photopolymer resin hardens, solidifies and/or forms, as will be appreciated. This process is repeated, until a preselected form has been achieved, i.e., enough photopolymer resin has been printed on the array 120 to achieve the desired results. In FIG. 1, the dark mirror coating 124 is a photopolymer resin that solidifies on the optical coating 122 of the array 124 upon exposure to UV light from the various UV lamps 106-108.

It is to be appreciated that in connection with the particular illustrative embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

Further non-limiting disclosure is set forth in the following one-sentence statements formulated as patent claims.

The invention claimed is:

1. A three-dimensional printer, comprising:
   a custom tray for placement of a prefabricated filter;
   wherein the three-dimensional printer is configured to deposit a photopolymer resin directly onto a surface of the prefabricated filter in a single layer forming an aperture mask that is a dark mirror coating consisting of a single photopolymer resin.

2. The three-dimensional printer of claim 1, wherein the custom tray includes a vacuum chuck configured to allow X, Y, and Z axis adjustments to hold the prefabricated filter at a predetermined start position for printing.

3. The three-dimensional printer of claim 1, wherein the three-dimensional printer is an inkjet printer.

4. The three-dimensional printer of claim 3, wherein the three-dimensional printer is configured to print the dark mirror coating via at least one inkjet head of the three-dimensional printer.

5. The three-dimensional printer of claim 1, wherein the three-dimensional printer is an extrusion-type three-dimensional printer.

6. The three-dimensional printer of claim 5, wherein the three-dimensional printer is configured to print the dark mirror coating via at least one extrusion port of the three-dimensional printer.

7. The three-dimensional printer of claim 1, wherein the prefabricated filter is a six-band optical filter.

8. The three-dimensional printer of claim 1, wherein the prefabricated filter is an optical filter array comprising a plurality of optical filter elements of different optical filter types, the optical filter elements bonded together to form an optical filter array.

9. The three-dimensional printer of claim 1, wherein the prefabricated filter is an optical filter array comprising a first set of a plurality of optical filter elements of different optical filter types, and a second set of a plurality of optical filter elements of different optical filter types, wherein the optical filter elements of the first and second sets have perpendicular sidewalls, the optical filter elements of the first and second sets are bonded together at the perpendicular sidewalls, and the first and second sets are bonded together to form a parallel optical array.

10. The three-dimensional printer of claim 1, further comprising at least one control component, the at least one control component configured to control the printing of the three-dimensional printer so as to adapt the printer for printing on the prefabricated filter.

11. The three-dimensional printer of claim 1, further comprising at least one ultra-violet lamp configured to solidify the photopolymer resin to form the aperture mask on the prefabricated filter.

12. A three-dimensional printer, comprising:
a tray configured to support a prefabricated multi-spectral optical filter array; and
a print block, comprising:
at least one dispensing component in fluid communication with a reservoir for storing a photopolymer resin, the at least one dispensing component configured to deposit the photopolymer resin directly onto a surface of the prefabricated multi-spectral optical filter array in a single layer forming an aperture mask that is a dark mirror coating consisting of a single photopolymer resin.

13. The three-dimensional printer of claim 12, wherein the print block further comprises at least one ultraviolet lamp configured to illuminate deposited photopolymer resin on the surface of the prefabricated multi-spectral optical filter array.

14. The three-dimensional printer of claim 12, wherein the tray comprises a vacuum chuck.

15. The three-dimensional printer of claim 14, wherein the vacuum chuck is configured to allow X, Y, and Z axis adjustments to locate a start position of the at least one dispensing component relative to the prefabricated multi-spectral optical filter array.

16. The three-dimensional printer of claim 12, wherein the three-dimensional printer is an inkjet printer.

17. The three-dimensional printer of claim 16, wherein the at least one dispensing component is at least one inkjet head, and the three-dimensional printer is configured to print the dark mirror coating via the at least one inkjet head of the three-dimensional printer.

18. The three-dimensional printer of claim 12, wherein the three-dimensional printer is an extrusion-type three-dimensional printer.

19. The three-dimensional printer of claim 18, wherein the at least one dispensing component is at least one extrusion port, and the three-dimensional printer is configured to print the dark mirror coating via the at least one extrusion port of the three-dimensional printer.

* * * * *